May 7, 1957  N. ROLASTON ET AL  2,791,265
PRESS FOR FORMING A REINFORCED EDGE ON
FABRIC BY FUSION AND PRESSURE
Filed Feb. 20, 1951  4 Sheets-Sheet 1

Inventors: Norman Rolaston
and Charles Crait Middleton;
By Baldwin + Wight, Attys.

United States Patent Office 2,791,265
Patented May 7, 1957

2,791,265

PRESS FOR FORMING A REINFORCED EDGE ON FABRIC BY FUSION AND PRESSURE

Norman Rolaston, London, and Charles Craib Middleton, Chalford Hill, near Stroud, England, assignors to British Industrial Plastics Limited, London, England, a British Company Application February 20, 1951, Serial No. 211,838

Claims priority, application Great Britain March 23, 1950

2 Claims. (Cl. 154—42)

This invention relates to a process, and a device useful for performing the process, for providing a single ply or an assembly of superposed plies of fabric with a reinforced or welded edge. The single ply or assembly must contain at least a substantial amount of fusible material, e. g. a thermoplastic such as polyvinylidene chloride. It is preferred, however, that the fusible material predominates in the single ply or assembly and a common use of the invention is with fabric wholly comprised of fusible material. Non-fusible material, e. g. cotton, which if used may be incorporated with fusible material in the same ply or plies, or, in the case of an assembly, may be the sole constituent of a separate ply or plies, provided always that the single ply or assembly treated contains at least a substantial amount of fusible material.

The sheets or plies of fabric used in the invention may be in the form of continuous sheets or films of material, or sheets of mesh material, e. g. knitted, woven or net. It is to be understood that general references to fabric in this specification include all such forms.

The invention finds particularly useful application when applied to open-mesh fabric made at least mainly of filaments of fusible material such that the interstices between adjacent substantially parallel filaments are larger than the filament diameter.

The most general use of the invention may be in the manufacture of a shaped article, e. g. an inner shoe sole or pad, comprising a number of plies of fusible material, preferably woven, welded together only at the edge. In this case, the invention provides for the stamping of such shaped articles out of superimposed sheets at the same time as welding together the edges of the shaped plies to form the article. By the process of the invention, a uniform weld of good appearance may be obtained neatly, efficiently and consistently by comparatively unskilled operators.

The invention further provides a process for fusing the marginal portion of a single ply of fabric in order to form a beading or selvedge which will strengthen the edge. This is especially useful in the case of the material being in net, woven or other mesh form when edge-fraying is likely, or in the form of thin sheets of plastic whose edges are liable to be torn.

According to the present invention, the process comprises locally treating the fabric ply or assembly of plies, so that the fusible material of a band thereof which is on one side of the line of the desired edge is brought into a flowable condition and at least a substantial part of said material is positively forced to flow towards said line and to unite there with the adjacent portions of the ply or plies which are on the other side of said line.

In the preferred form of the invention, the said portion of the single ply or assembly is brought into a flowable condition by locally compressing and heating this portion to cause it to fuse, the compression forcing the fused material to flow in the direction specified. The adjacent portion of the ply or plies which is on the other side of the said line to the portion which is brought into a flowable condition is preferably supported throughout the operation so as to prevent distortion. The compressing and heating is suitably effected between a pair of heated surfaces between which the fabric is pinched and the supporting of the fabric is suitably effected by another pair of surfaces, preferably cooled, which clamp the fabric between them sufficiently firmly to hold it definitely in position. There will normally be provided a channel between the two pairs of surfaces, the channel being suitably provided by chamfering the edge or edges of the press surfaces which are adjacent to the clamping surfaces, the fused material being forced to flow into this channel to form, on solidifying, a substantially solid border, which, in the case of an assembly of plies, unites with the adjacent portions of the plies to form a strong weld.

In the case that a shaped article, e. g. an inner shoe sole or pad, is to be manufactured, the apparatus may comprise an endless press surface shaped to the outline of the article and closely circumscribing a clamping surface disposed within and adapted to act coaxially within the press surface, the inner edge of the press surface being chamfered as described above to provide a continuous channel. The clamping surfaces are preferably made of a conducting material and provided with cooling, e. g. water-cooling, means.

When the fabric contains a non-fusible material, some of this material may not be extruded from between the press surfaces and these protruding pieces of non-fusible material may need to be severed after the weld has been formed.

The invention is illustrated in the accompanying drawings which show a tool for stamping inner soles out of superposed plies of thermoplastic material such as polyvinylidene chloride. This tool is in two parts adapted to be secured respectively to the top and bottom tables of a press. The tool is adapted for stamping out two inner soles simultaneously. In the drawings, Figure 1 is a plan view on the line 1—1 of Figure 2, and shows only that part of the tool which stamps out one of the soles, the two parts of the tool being symmetrical;

Figure 2:
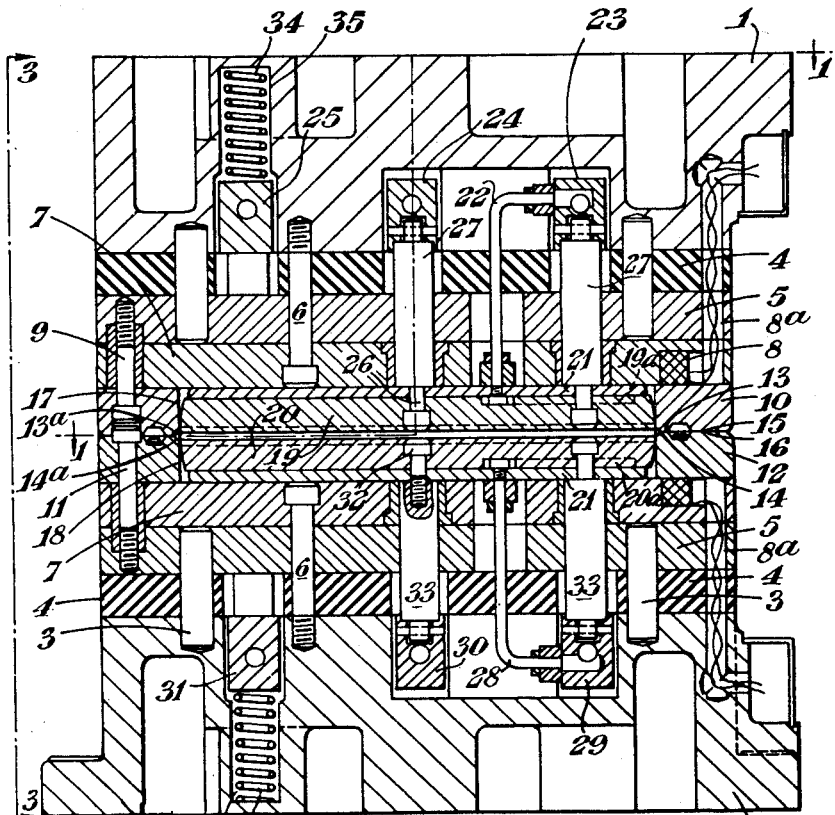
Figure 2 is a section on the line 2—2 of Figure 1.

Figure 2 shows the upper and lower halves of the tool secured respectively on a top stool 1 and a bottom stool 2. Secured to each stool by bolts 3 are insulation pads 4 and steel cover plate 5. Secured by bolts 6 to each assembly of steel, insulation plate and cover plate, is a steel heater plate 7 containing an induction heating coil a section of which is indicated at 8 and whose leads emerge through a passage 8a. Secured by bolts 9 to the upper heater plate 7 is an upper steel press member 10 and secured to the lower heater plate 7 by bolts 11 is a lower steel press member 12. The press members 10 and 12 are formed respectively with operative press surfaces 13 and 14 and pressure faces 15 and 16, each press surface being continuous and enclosing an area shaped to the form of the sole. The inner edges of the press surfaces 13 and 14 are chamfered to form concave recesses 13a and 14a respectively which together form a continuous channel.

Inside the cylinder formed by the vertical inner walls 17 and 18 of the press members 10 and 12 respectively, opposing clamping members 19 and 20, made of brass, are adapted to reciprocate. Each clamping member 19 and 20 is formed with a waterway 19a and 20a respectively, on its outside face, and each waterway is covered by a copper cover plate 21. The waterway 19a of the upper clamping member 19 is adapted to be continuously circulated with cooling water via pipes 22 (only one being shown) which respectively connect the waterway 19a with ducts in three cross bars 23, 24 and 25. These three cross bars are rigidly secured to the upper clamping member 19 by bolts 26 which are passed through holes in the inner face of the member 19 and into pillars 27, the pillars being screwed into the cross bars (the securing means for cross bar 25 not being shown). The waterway 20a in the lower clamping member 20 is similarly circulated with cooling water via pipes 28 leading to ducts in three cross bars 29, 30 and 31, these cross bars being similarly secured to the member 20 by means of bolts 32 and pillars 33. The pipes 22 and 28 and the pillars 27 and 33 all pass between the insulating pads 4 and through the cover plates 5 and the heater plates 7. The top and bottom stools 1 and 2 are formed with suitable cavities and the heater plates 7 are bushed to allow reciprocation, within each half of the tool, of the unit comprising clamping member, pipes, cross bars and pillars.

The cross bars 23 and 25 are acted upon by compression springs 34 housed in cylindrical cavities 35 formed in the upper stool 1. Similarly, the cross bars 29 and 31 are influenced by compression springs 36 housed in cavities 37 formed in the bottom stool 2. The ends of the cross bars 29, 30 and 31 are secured respectively to two tie bars 38 (shown in Figure 3). An upstanding pillar 39 is screwed through each end of the tie bars 38 and retained by a lock-nut 40. The pillar 39 is adapted to reciprocate with the lower clamping member 20 within a bush 41. A pad 42 is provided as a lower stop and the upper stop is provided by a pillar 43 secured by a bolt 44 to the upper heater plate 7.

Figure 1:
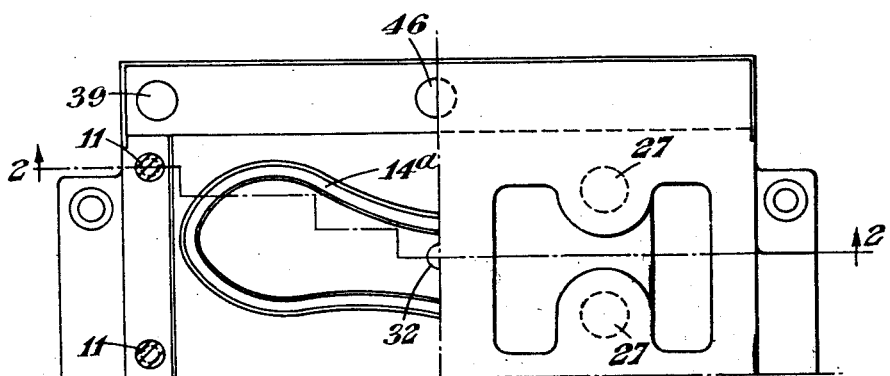
Figure 3:
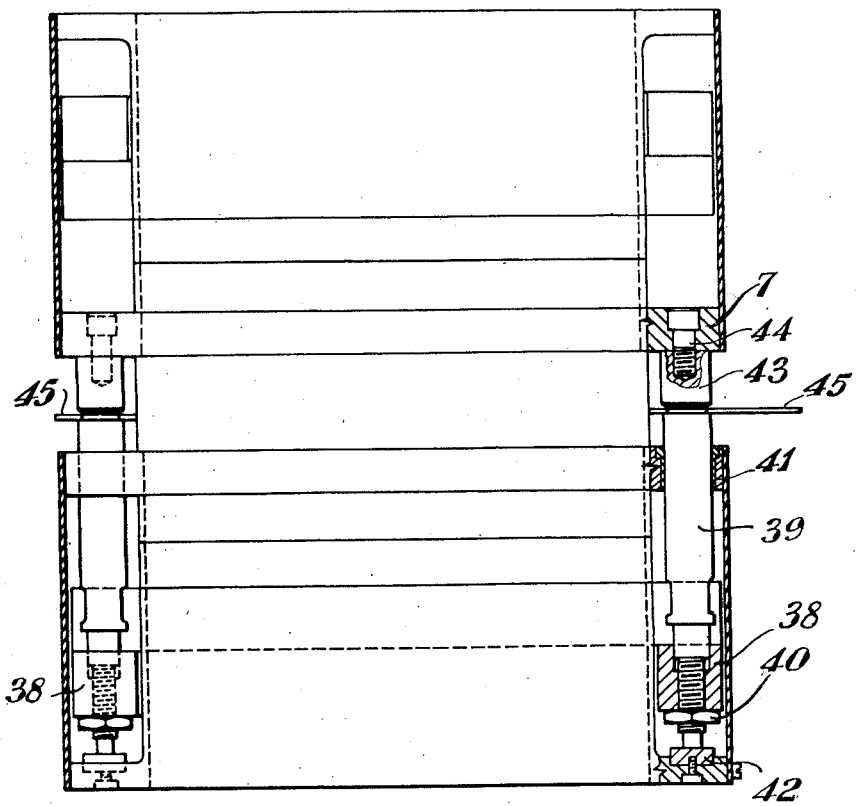
Figure 3 is an end elevation in part section taken on the line 3—3 of Figure 2.
Figure 4:
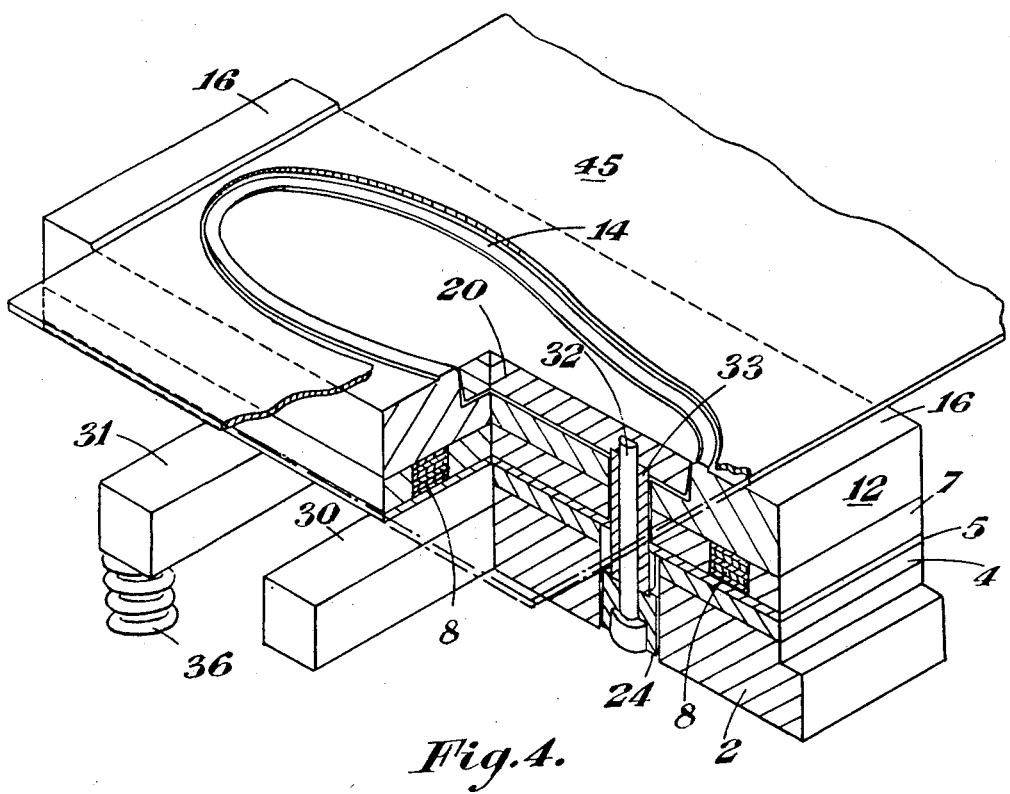
Figure 4 is an isometric view, partly sectioned, of the lower half of Figure 2.

A loading table 45, shown in Figures 3 and 4 but omitted from Figures 1 and 2 for clarity, is provided between the press members 10 and 12, the table having a sole-shaped cut-away portion of a size sufficient to accommodate the press surfaces 13 and 14. The press surfaces 13 and 14 and the pressure faces 15 and 16 of the press members 10 and 12 are upstanding in relief with respect to the intermediate surfaces of the press members and this provides a space to accommodate the loading tray 45 when the tool is closed. The table 45 is rigidly secured to the tops of two pillars 46 which are upstanding from the two tie bars 37 respectively.

Figures 4-8 are included for the purpose of assisting a ready comprehension of the working principles involved in the operation of the process and the tool according to the invention. They are diagrammatic and do not correspond in exact detail with Figures 1 and 2.

Figure 8:
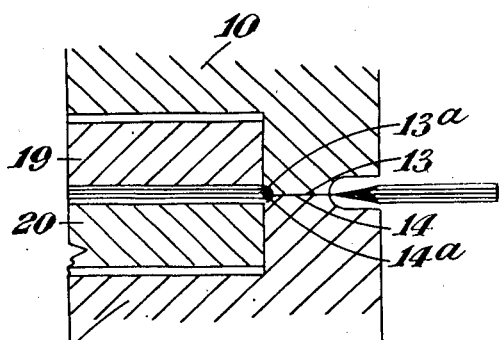
Figure 9:
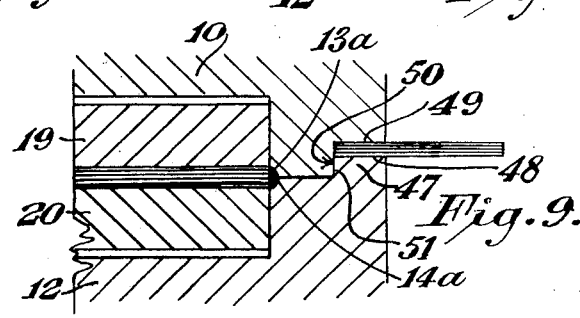
Figure 9 shows an alternative construction of the press members.

Figure 9 shows diagrammatically an alternative construction of the press members 10 and 12, which construction is designed to cause substantially all the fused material between the operative press surfaces 13 and 14 to flow into the continuous channel formed by the recesses 13a and 14a, instead of part being extruded in the other direction as shown in Figure 8. To this end, the press member 12 is formed with an upstanding portion 47 circumscribing the press surface 14, the press member 10 being formed with a suitable recess to accommodate the upstanding portion 47 in the operative position leaving a space between the top face 48 of the upstanding portion 47 and the horizontal face 49 of the recess in order to accommodate the unused material. There should be as little clearance as possible between the side face 50 of the upstanding portion 47 and the vertical face 51 of the recess.

Figure 5:
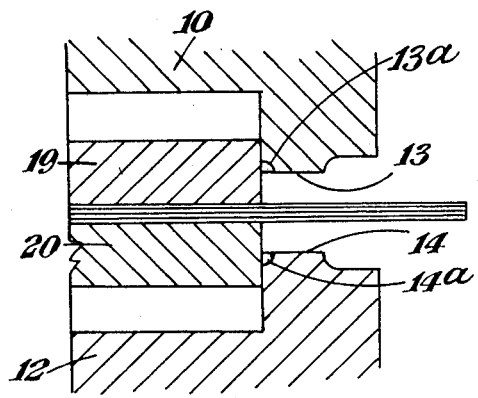
Figure 5, 6, 7 and 8 show diagrammatically successive stages in the operation of the tool.
Figure 7:
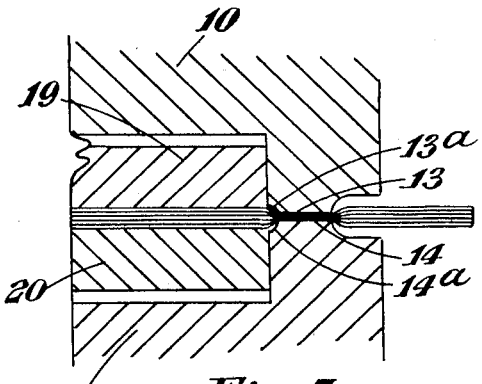
Figure 6:
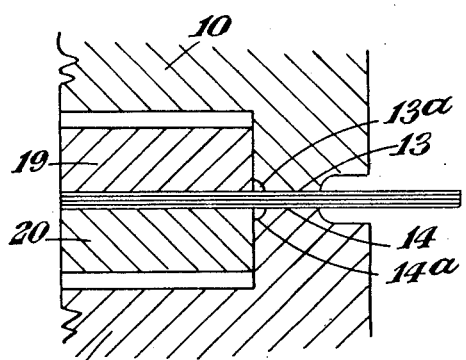

In the working of the tool shown in the drawings, the top stool 1 is secured to the top table of a press and the bottom stool 2 is secured to the bottom table. On opening the press, the top half of the tool will be raised away from the bottom half and the compression springs 34 and 36 will exert their influence via the cross bars and pillars 27 and 33 to force the clamping members 19 and 20 to protrude beyond the press surfaces 13 and 14 as shown in Figure 5. Superposed plies of the fabric required for the inner sole to be manufactured are fed on to the loading table 45. The press is slowly closed until the clamping members 19 and 20 contact the material lying over the sole-shaped cut-away portion of the table 45. This position is illustrated by Figure 5. On further closing of the press, the clamping members 19 and 20 are forced back between the walls 17 and 18 against the action of the compression springs 34 and 36 until the press surfaces 13 and 14 cause the material between these surfaces to fuse as illustrated in Figure 7. The press surfaces 13 and 14 are finally pressed into contact thereby squeezing the fused material to the left and to the right as shown in Figure 8, or only to the left as shown in Figure 9, the material extruded to the left filling the continuous channel formed by the recesses 13a and 14a. The material which solidifies in this continuous channel unites with all the plies thereby forming a welded edge.

Wear on the press surfaces 13 and 14 is reduced by the provision of the pressure faces 15 and 16 which share with the press surfaces the load imposed by the press.

The details shown in Figure 3 form a device for ensuring that the clamping members 19 and 20 hold the material substantially in the plane of the contacting of the press surfaces. Without these means, the clamping members 19 and 20 would be solely under the influence of the compression springs 34 and 36 respectively, and if, say, the springs 36 were the stronger, then the clamping members would hold the material above the plane of the contacting of the press surfaces. When the two halves of the tool assume the position illustrated in Figure 5, the pillars 43 secured to the upper heater plate 7 contact the tops of the pillars 39 and force them downward, together with the tie bars 38 and clamping member 20. The bottoms of the pillars 39 will eventually come into contact with the pads 42 and further downward movement of the clamping member 20 relative to the walls 18 of the press member 12 will be prevented. The pillars 39 are so adjusted relative to the tie bars 38 that they contact the pads 42 substantially at the same time as the clamping member 20 reaches the position shown in Figure 8. After this position is reached, the only clamping force on the material is exerted by the springs 34 since substantially all the force exerted by the springs 36 is taken by the pillars 43. The springs 36 cannot then be further compressed by the force exerted by springs 34.

The other part of the double tool, which part is only shown in end elevation in Figure 3, utilises the same cross bars and the same locating means (shown in Figure 3) for the lower clamping member 20 as those described above. The ducts in all six cross bars are also part of the water-cooling system for the other part of the tool.

It will be seen that, with the specific construction shown in the drawings the press members 10 and 12 may be changed for ones of different size, for obtaining different sizes of inner soles, by removing bolts 11. Similarly, the clamping members 19 and 20 may be changed for ones of different size by removing bolts 26 and 32.

We claim:

1. A press mechanism for forming by fusion and pressure a reinforced edge on fabric composed wholly or mainly of fusible material, comprising a pair of cooperating clamping members and a pair of cooperating press members, heating means for said press members, said pair of press members having inner surfaces relatively close to the marginal surfaces of said clamping members, said press members having opposed press surfaces intersecting said inner surfaces, the apex portions of said press members at the intersections being cut away at both said inner surfaces and press surfaces to provide collectively a bead-forming channel for extrusion of material fused between the press surfaces and by the press surfaces laterally onto the edge of the fabric from which it was detached to marginally reinforce the latter, the said clamping members being floating in said structure, and springs urging said clamping members forwardly from said press members, the said springs being designed to impose a desired clamping pressure, and the construction being such that when the said structures are moved towards each other and the clamping members have clamped the work, the said press members will continue to move and pass through the work between them.

2. A mechanism for forming by fusion and pressure a reinforced edge on fabric composed wholly or mainly of fusible material, comprising a pair of cooperating relatively movable clamping members, a pair of cooperating press members movable relatively to each other and to said clamping members, heating means for said press members, said pair of press members having inner surfaces conforming to and operable relatively close to the marginal surfaces of said clamping members, said press members having opposed press surfaces intersecting said inner surfaces, the apex portions of said press members at the intersections being cut away at both said inner surfaces and press surfaces to provide collectively a bead-forming channel for extrusion of material fused between the press surfaces and by the press surfaces laterally onto the edge of the fabric from which it was detached to marginally reinforce the latter.

References Cited in the file of this patent

UNITED STATES PATENTS

| | | |
|---|---|---|
| 689,157 | Berstorff et al. | Dec. 17, 1901 |
| 1,500,621 | Hubbard | July 8, 1924 |
| 1,625,582 | Anderson | Apr. 19, 1927 |
| 1,773,926 | Michael | Aug. 26, 1930 |
| 2,118,080 | Goodwin | May 24, 1938 |
| 2,172,546 | Riel | Sept. 12, 1939 |
| 2,260,667 | Hoof | Oct. 28, 1941 |
| 2,390,337 | Spotz | Dec. 4, 1945 |
| 2,425,388 | Oestricher | Aug. 12, 1947 |
| 2,433,176 | Van Epps et al. | Dec. 23, 1947 |
| 2,435,467 | Spencer | Feb. 3, 1948 |
| 2,481,602 | Lindh | Sept. 13, 1949 |
| 2,632,724 | Lumbard | Mar. 24, 1953 |